No. 821,060. PATENTED MAY 22, 1906.
A. PUSTERLA & P. TESTI.
WATER CAROUSEL.
APPLICATION FILED DEC. 8, 1904.

2 SHEETS—SHEET 1.

Witnesses.
Harry L. Amer.
R. Bommers

Inventors.
Attilio Pusterla
Paolo Testi.
by Henry Orth
attys.

No. 821,060.  
PATENTED MAY 22, 1906.
A. PUSTERLA & P. TESTI.  
WATER CAROUSEL.  
APPLICATION FILED DEC. 8, 1904.
2 SHEETS—SHEET 2.
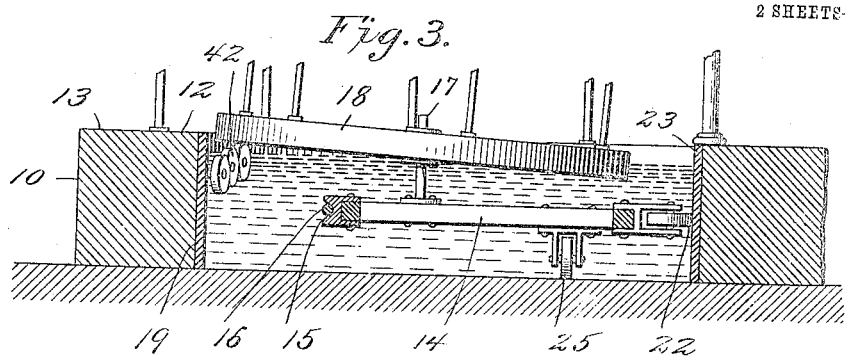
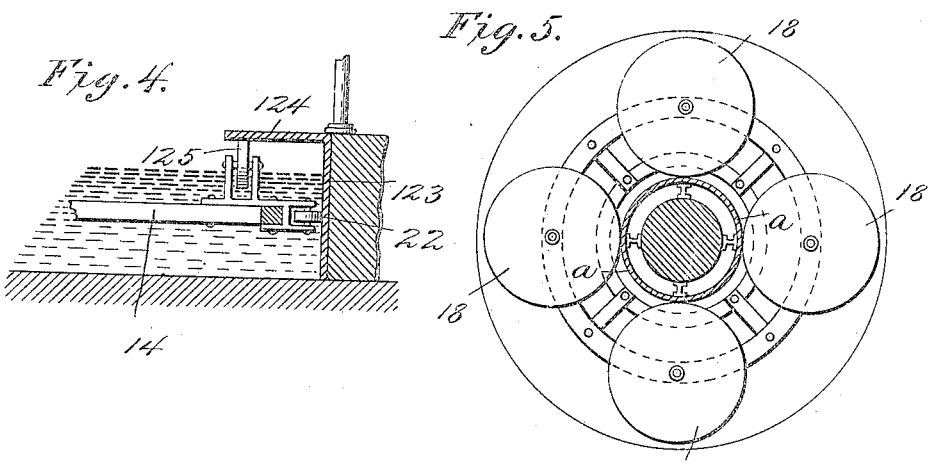
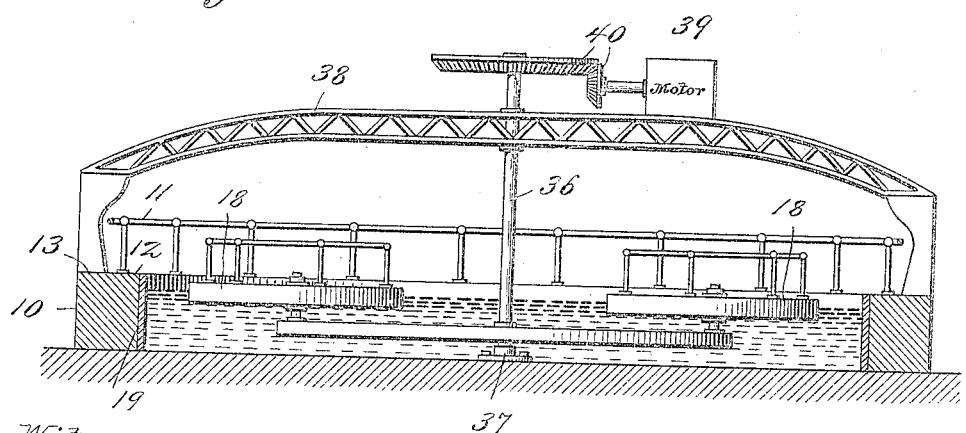
Witnesses.  
Harry L. Amer.  
Inventors.  
Attilio Pusterla  
Paolo Testi.  
by Henry Orth  
attys.

UNITED STATES PATENT OFFICE.

ATTILIO PUSTERLA AND PAOLO TESTI, OF BROOKLYN, NEW YORK.

WATER-CAROUSEL.

No. 821,060. Specification of Letters Patent. Patented May 22, 1906.

Application filed December 8, 1904. Serial No. 236,034.

*To all whom it may concern:*

Be it known that we, ATTILIO PUSTERLA and PAOLO TESTI, subjects of the King of Italy, residing at Coney Island, Brooklyn, State of New York, have invented certain new and useful Improvements in Water - Carousels; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

Our invention relates to carousels or merry-go-rounds, and has for its object the provision of floating platforms, together with means to translate them or cause them to travel in a given direction and means to rotate the platforms, the platforms specifically having a cycloidal movement, with means to rock them, and details of constructions, to be hereinafter fully described and claimed.

Figure 1:
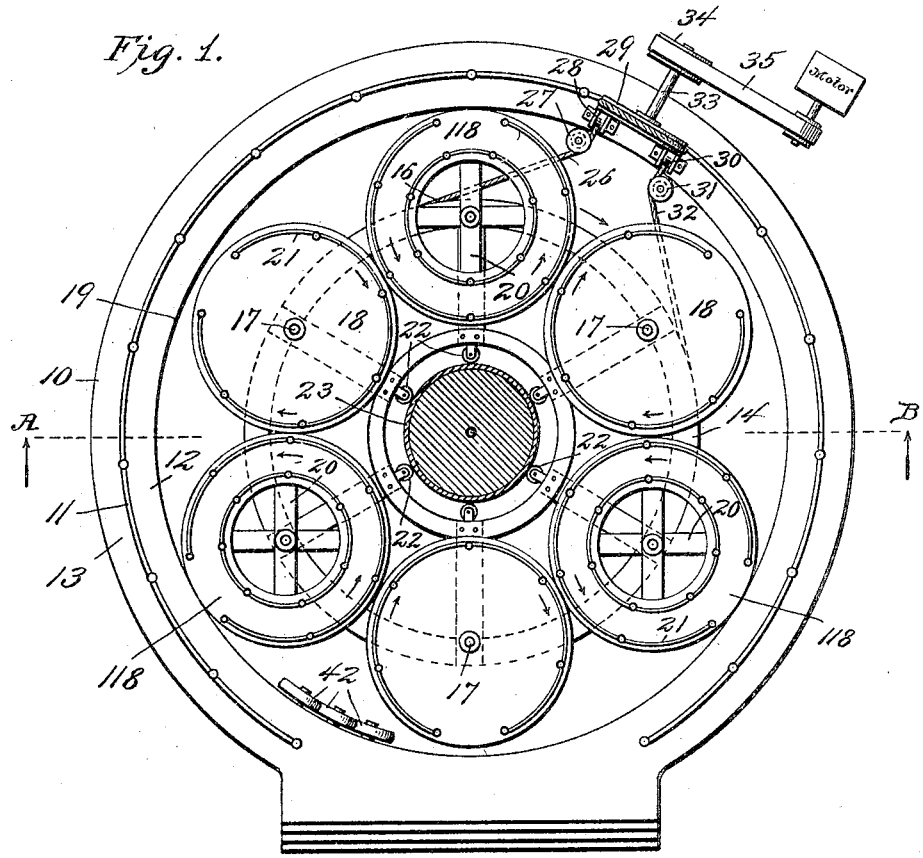
Figure 2:
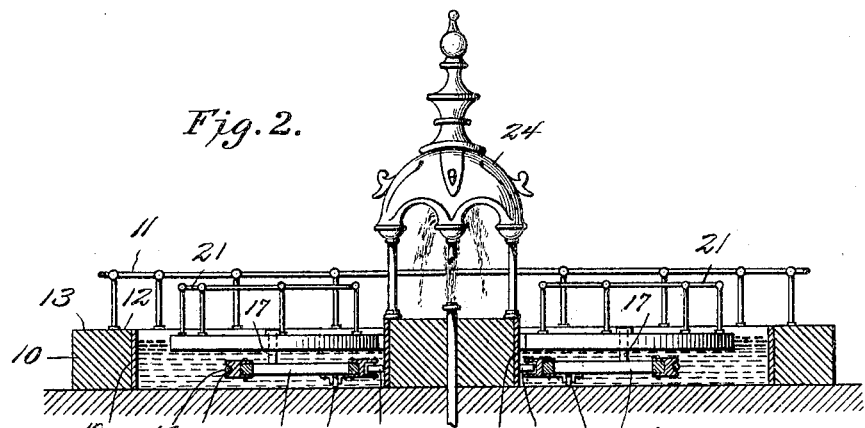

Referring to the drawings, in which like parts are similarly designated, Figure 1 is a plan view of one form of our device, partly in section. Fig. 2 is a section on the line A B, Fig. 1. Fig. 3 is a detail section, on a larger scale, showing the means to rock the platforms. Fig. 4 is a modification showing how a driving-spider is held submerged. Fig. 5 is a diagrammatic view of epicycloidal movement. Fig. 6 is a section of a modification.

The speed of carousels is on the whole not excessively rapid, and in view of this we have found that much of the weight of the moving parts can be taken up and supported on a body of water without interfering with the driving of the apparatus, at the same time giving a pleasing sensation not obtained when the water is not present. We construct a suitable basin 10, preferably, but not necessarily, circular, the rim of which is divided by a railing 11 into two portions, one, 12, for the movement of passengers to and from the platforms, and the other, 13, for spectators. The latter portion may or may not be provided with seats.

Within the basin is a submerged spider or wheel 14, having a peripheral groove 15, in which takes a driving-rope 16, and mounted on the wheel are spindles 17, on which are loosely mounted passenger-platforms 18 118, so as to rotate, six of which are shown in Fig. 1, the alternate platforms 118 having frictional contact with the interior of the basin 10 and preferably on a metallic friction-ring 19. These platforms 118 have an annular form and are provided with one or more preferably submerged braces 20, through which the spindles 17 pass. We have shown each platform provided with railings 21; but these may be omitted altogether or may be used in conjunction with animals, buggies, or any other form of passenger-carriers in common use on the carousels as now constructed. The spider or wheel 14 also has near its center friction-rollers 22, that roll on a central post or platform, preferably on a metal ring 23, secured on the center of the basin to maintain the spider concentric with the basin when rotated. At the center of the basin may be a simple platform, a decorative fountain 24, or any scenic feature that the particular taste of the constructor may see fit to use.

In Figs. 1 and 2 the spider 14 is of metal and being heavier than the water is provided with supporting-rollers 25; but should the spider be of wood, having a tendency to float, as in Fig. 4, the central plate 123 is provided with an overhang 124, under which takes the friction-rollers 125. The outer portion of the spider will need no such limiting means, as the platforms, with their load of passengers, will keep it down. The driving-rope 16 is endless, and the running-off portion 26 passes over horizontal pulley 27, vertical pulley 28, driving-pulley 29, vertical pulley 30, and horizontal pulley 31, becoming the running-on portion 32 of the rope. The pulley 29 is mounted on a shaft 33, driven by a pulley 34, connected to a suitable motor by belt 35.

In Figs. 1 and 2 we have shown the alternate platforms 118 having rolling contact on the inner rim of the basin, ring 19, while the other platforms 18 are frictionally rotated by those 118, thereby rotating adjacent platforms in opposite directions. It is of course obvious that all the platforms can have frictional contact with the ring 19 by suitably proportioning the parts. In these two views, Figs. 1 and 2, the platforms have a hypocycloidal movement; but in Fig. 5 we have shown the platforms having frictional contact with a central ring *a*, thereby imparting epicycloidal movement to the platforms. In all these forms the spider is driven by a flexible rope; but in Fig. 6 we have shown the spider directly driven from a central shaft 36, stepped in a suitable bearing 37. Above the structure, mounted on suitable girders 38, is the motor 39, geared by miter or other gear 40 to the shaft 36. At one or more points of the periphery of the basin means are provided to rock the platforms, and consist of rollers, herein shown as three rollers 42 at different elevations, over which the edges of the platforms ride and drop off the highest roller, thereby rocking each platform as it is moved in its course, or, the case may be, rock only each alternate platform, depending upon the width of the face of the rollers.

Having thus described our invention, what we claim as new therein, and desire to secure by Letters Patent, is—

1. In a carousel, the combination with a suitable basin and a body of water therein, of platforms floating on and supported by the water, means to rotate the platforms and means to translate them having devices to maintain the centers of said platforms in their positions with respect to each other, substantially as described.

2. In a carousel, the combination with a suitable basin and a body of water therein, of platforms floating on and supported by the water, means to translate the platforms having devices on which the platforms are rotatably mounted and means constantly coöperating with the platforms to rotate them on their axes, substantially as described.

3. In a carousel, the combination with a suitable basin and a body of water therein, of platforms floating on and supported on the water, means to maintain the centers of said platforms in their relative positions, means to rotate the platforms, means to translate said platforms and means to rock the platforms, substantially as described.

4. In a carousel, the combination with a suitable basin and a body of water therein, a submerged rotatable element, projecting pins on the periphery of the element on which said platforms are revolubly mounted and means frictionally engaging with the platforms to rotate them during their travel, and rollers over which the edges of the platforms ride, substantially as described.

5. In a carousel, the combination with a suitable basin and a body of water therein, a friction-ring therein, a driven spider, spindles projecting from the spider, floating platforms mounted on the spindles, some of the platforms coöperating with the ring and some of the platforms in frictional engagement with the aforementioned ones, and submerged rollers in the path of the platforms to rock them, substantially as described.

6. In a carousel, the combination with a suitable basin, a body of water therein, a friction-ring at its periphery and a similar ring at its center, a submerged spider, means to rotate it, antifriction-rollers at the central portion of the spider to engage the ring at the center, spindles on the spider, floating platforms mounted on the spindles, some of the platforms having frictional engagement with the ring at the periphery, and the remaining platforms in frictional engagement with the aforementioned ones, a set of submerged rollers at different levels at the periphery of the basin and in the path of the platforms, substantially as described.

7. The combination with a suitable basin and a suitable liquid in said basin, of floating platforms, a rotatable submerged element, means to rotatively mount the platforms thereon, said platforms frictionally coöperating with the basin to be thereby rotated.

8. The combination with a suitable basin and a body of water therein, a friction-ring therein, a driven spider, spindles projecting from the spider, floating platforms mounted on the spindles, some of the platforms coöperating with the ring to rotate on the spindles and some of the platforms coöperating with the aforementioned ones to rotate in an opposite direction.

9. The combination with a suitable basin and a body of water therein, of a driven submerged spider, means to maintain the spider submerged and above the bottom of the basin, spindles on the spider and floating circular platforms mounted on the spindles, alternate platforms rolling on the inner edge of the basin and the other platforms rolling on the former ones.

In testimony that we claim the foregoing as our invention we have signed our names in presence of two subscribing witnesses.

ATTILIO PUSTERLA.
PAOLO TESTI.

Witnesses:
WILLIAM BECK,
FRANCE B. FOX.